(12) United States Patent
Rouyre et al.

(10) Patent No.: US 10,452,811 B2
(45) Date of Patent: Oct. 22, 2019

(54) CONTROL OF A DEVICE WITH RESPECT TO ITS NUMERICAL MODEL

(71) Applicant: Airbus Operations (S.A.S.), Toulouse (FR)

(72) Inventors: François Rouyre, Cornebarrieu (FR); Pascal Chaumel, Plaisance du Touch (FR); Samuel Burgunder, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/965,318

(22) Filed: Apr. 27, 2018

(65) Prior Publication Data

US 2018/0247009 A1    Aug. 30, 2018

Related U.S. Application Data

(63) Continuation of application No. PCT/FR2016/052785, filed on Oct. 26, 2016.

(30) Foreign Application Priority Data

Oct. 28, 2015 (FR) ...................................... 15 60303

(51) Int. Cl.
*G06F 17/50* (2006.01)
*G06T 7/30* (2017.01)
*G06T 7/00* (2017.01)
*G06T 17/00* (2006.01)

(52) U.S. Cl.
CPC .......... *G06F 17/5095* (2013.01); *G06F 17/50* (2013.01); *G06T 7/001* (2013.01); *G06T 7/30* (2017.01); *G06T 17/005* (2013.01); *G06F 2217/14* (2013.01); *G06F 2217/16* (2013.01); *G06T 2207/10024* (2013.01); *G06T 2207/10028* (2013.01); *G06T 2207/20072* (2013.01); *G06T 2207/30164* (2013.01); *G06T 2219/012* (2013.01)

(58) Field of Classification Search
CPC .............................. G06F 17/5095; G06T 7/30
See application file for complete search history.

(56) References Cited

PUBLICATIONS

Written Opinion of Application No. PCT/FR2016/025785 dated Mar. 22, 2017.
Declaration of Non-Establishment of ISR of Application No. PCT/FR2016/025785 dated Mar. 22, 2017.

*Primary Examiner* — Jitesh Patel
(74) *Attorney, Agent, or Firm* — Jenkins, Wilson, Taylor & Hunt, P.A.

(57) ABSTRACT

Method and system of simple, precise, rapid and automatic control to verify fit between a manufactured device and its digital mock-up modelling it beforehand. The system includes a scanner configured to produce a three-dimensional cloud of points representative of the device, as well as a processor and a memory configured to superpose the cloud of points on the digital mock-up, coordinate the cloud of points with polychrome images captured during the scanning of the device and stored in a memory, disperse the cloud of points into several sets of points, each set of points corresponding to an object identified in the polychrome images, establish a correspondence between the sets of points and nodes of a treelike structure identifying the digital mock-up, and evaluate a fit between the cloud of points and the digital mock-up by analyzing the correspondence between the sets of points and the nodes of the treelike structure.

13 Claims, 7 Drawing Sheets

CONTROL OF A DEVICE WITH RESPECT TO ITS NUMERICAL MODEL

CROSS-REFERENCE TO RELATED APPLICATIONS

This application is a continuation of and claims priority to PCT/FR2016/052785 filed Oct. 26, 2016 which claims the benefit of and priority to French Patent Application No. 15 60303 filed Oct. 28, 2015, the entire disclosures of which are incorporated by reference herein.

TECHNICAL FIELD

This disclosure herein relates in general to testing a device with regard to its digital mock-up, and in particular testing a device before installing it in an environment that can be congested for example on board an aircraft.

BACKGROUND

At the present time, CAD (Computer Aided Design) systems are used in many industrial domains to create three-dimensional Digital Mock-Ups (DMU) to be able to do the design, assembly and installation in a contextual environment, and to make virtual tests of devices before they are fabricated.

A three-dimensional digital mock-up is a sort of modifiable prototype capable of simulating the global behavior of the designed device. It can be used to improve the reliability of fabrication, to define appropriate fabrication tools and to optimize costs.

However, there can be some disagreement between the physical (i.e. fabricated) device and its digital mock-up. Assembly complications or interactions between the different elements of the device (related to measurement divergences, tolerances, oversizing, etc.) can occur thus creating disagreements with the model. This can make it more complicated to integrate the device into a dedicated environment, and in particular into a congested environment for example such as on board an aircraft. Furthermore, once the real device has been installed in its environment, it may be physically difficult or even impossible to access some spaces around this device without disassembling it. It will be noted that a device comprising oversized parts relative to the mock-up can interact with other nearby devices and possibly cause early damage or wear that is difficult to detect on some elements of the device itself or its surroundings.

It is thus important to inspect the fabricated device before it is installed. This inspection is tedious, long and expensive. It requires a complex analysis including making many measurements on the fabricated device and comparing these measurements with those of the digital mock-up. These measurements are fairly complicated in practice and their precision depends on the gauges or the measurement tools used.

Consequently, a purpose of this disclosure herein is to disclose a method and a system for making a precise, fast and automatic test of a device previously modelled by a digital mock-up.

SUMMARY

The disclosure herein is defined by a method for testing a device previously modelled by a three-dimensional digital mock-up, the digital mock-up being identified by a treelike structure of logical nodes, the method comprising:

three-dimensional scanning of the device, the scanning producing a three-dimensional point cloud representative of the device;
superposition of the point cloud on the digital mock-up;
coordination between the point cloud and polychrome images captured when the device is scanned;
separation of the point cloud into several point sets using the coordination, each point set corresponding to an object identified in the polychrome images;
establishment of a correspondence between the point sets and the nodes of the treelike structure; and
evaluation of a fit between the point cloud and the digital mock-up by analyzing the correspondence between the point sets and the nodes of the treelike structure.

This makes it possible to automatically evaluate the fit between the fabricated device and its design model.

Advantageously, the digital mock-up is configured to model the device and its environment, knowing that the same steps in the above method are applied to the environment, and the method also comprises a step to verify integration of the device into its environment, as a function of the fit.

This provides a way of verifying the real arrangement of the device relative to its environment before it is physically installed.

According to one embodiment of the disclosure herein, the fit between the scanned image and the digital mock-up includes:
evaluate differences between each point set and the part of the mock-up associated with the node corresponding to the point set; and/or
evaluate distances between the point cloud and the part of the digital mock-up modelling the environment in the vicinity of the device.

This provides a way of automatically measuring any deviations between the device and its model, and also verifying that there is no interference or friction between the device and its environment.

According to one embodiment of the disclosure herein, coordination between the point cloud and the polychrome images is made by synchronizing the polychrome images with the point cloud on successive capture dates of the polychrome images, and in that separation of the point cloud into several point sets comprises:
identification of objects with elementary physical characteristics in the polychrome images; and
sub-division of the point cloud into the point sets, associating each point set with a corresponding object identified in the polychrome images.

This facilitates and optimizes separation of the point cloud. Relating the point cloud to polychrome images makes it possible to use powerful and known image processing software to isolate objects in the images and then packets of points in the point cloud related to objects identified in the polychrome images can easily be found.

The correspondence between the point sets and nodes in the treelike structure is defined by a construction of a new treelike structure of logical nodes related to the point cloud in parallel to that identifying the digital mock-up.

Advantageously, the method comprises the emission of an alert if a point set does not have a corresponding node in the treelike structure of the digital mock-up.

As a result, it is possible to verify an installation error and to identify the object that is not represented in the digital mock-up.

The method also comprises issuing an alert in the case in which a node in the treelike structure of the digital mock-up has no antecedent in the point sets in the point cloud.

Advantageously, the method includes saving point sets in first files organized according to the treelike structure, and establishment of links between the first files and second files associated with the treelike structure of the digital mock-up.

This can facilitate manipulation of the three-dimensional scan with regard to the Digital Mock-Up (DMU).

Advantageously, the fit is automatically represented by a digital montage of the point cloud on the digital mock-up, the digital mock-up being represented by a first color, the point cloud being represented by a second color and each part of the montage with a difference between the digital mock-up and the point cloud exceeding a predetermined tolerance threshold being represented by a third color.

As a variant, the fit is represented by a digital montage of the point cloud on the digital mock-up, the digital mock-up being represented by a first color, the point cloud being represented by a second color and each part of the montage with a positive difference between the digital mock-up and the point cloud being represented by a graduated third color according to a first color scale, and each part of the montage with a negative difference between the digital mock-up and the point cloud being represented by a graduated fourth color according to a second color scale.

The disclosure herein also relates to a system for testing a device previously modelled by a three-dimensional digital mock-up, the digital mock-up being identified by a treelike structure of logical nodes, the system comprising a scanner configured to produce a three-dimensional point cloud representative of the device, and a processor and a memory configured to:

superpose the point cloud on the digital mock-up;
coordinate the point cloud with polychrome images captured when the device is scanned and stored in a memory;
separate the point cloud into several point sets, each point set corresponding to an object identified in the polychrome images;
establish a correspondence between the point sets and nodes of the treelike structure; and
evaluate a fit between the point cloud and the digital mock-up by analyzing the correspondence between the point sets and the nodes of the treelike structure.

Advantageously, the digital mock-up is adapted to model the device and its environment, the processor also being configured to verify integration of the device into its environment by evaluating distances between the point cloud and the part of the digital mock-up modelling the environment in the vicinity of the device.

The disclosure herein also relates to a computer program comprising code instructions for use of the test method according to any one of the above characteristics, when it is executed by a processor.

BRIEF DESCRIPTION OF THE DRAWINGS

Other characteristics and advantages of the disclosure herein will become clear after reading preferred embodiments of the disclosure herein, given with reference to the attached, example figures, among which.

DETAILED DESCRIPTION

Figure 1:
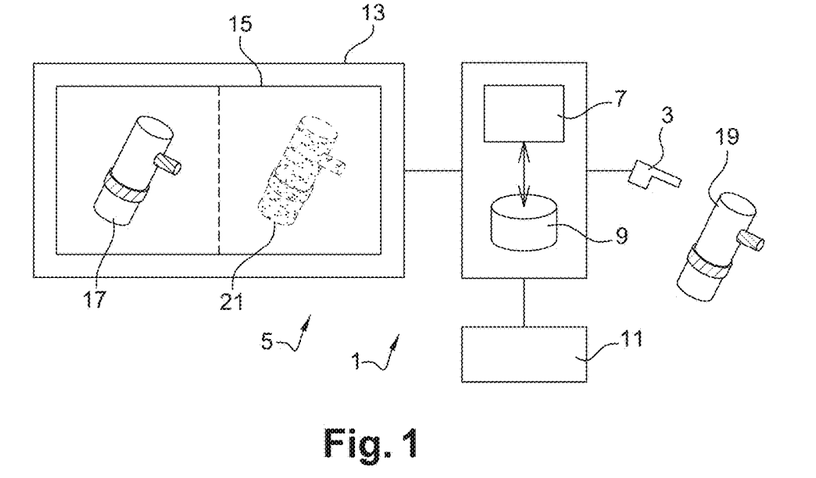
FIG. 1 diagrammatically illustrates a system for testing a device modelled by a digital mock-up, according to one embodiment of the disclosure herein.

FIG. 1 diagrammatically illustrates a system for testing a device modelled by a digital mock-up, according to one embodiment of the disclosure herein.

The system 1 comprises a three-dimensional scanner 3 adapted to be coupled to a calculation station or computer 5. This calculation station or computer normally comprises at least one processor 7, at least one memory 9, at least one input peripheral 11 and at least one output peripheral 13 comprising a display screen 15.

The memory 9 and the processor 7 are suitable for storing and implementing modelling or design software. Thus, the processor 7 is configured to model an object or a device by executing this design software. In particular, modelling of the device consists of or comprises creating a three-dimensional DMU (Digital Mock-Up) that can be displayed on the screen 15 of the computer 5. For example, the digital mock-up can be used to model furniture (Galley type for a galley on board an aircraft or toilets), or a system (such as a battery, a valve or a computer).

According to the disclosure herein, the physical device 19 (i.e., furniture, system, etc.) is scanned with the scanner 3 and the resultant three-dimensional point cloud 21 (displayed on the screen 15) is compared with the digital mock-up 17 using a sequence of images of the device captured by the scanner as intermediary, so as to test the definition and fit between this device 19 and its mock-up 17.

The memory 9 and the processor 7 are configured to implement a computer program comprising code instructions adapted to implementation of a method of testing the device 19 against its model 17.

Figure 2:
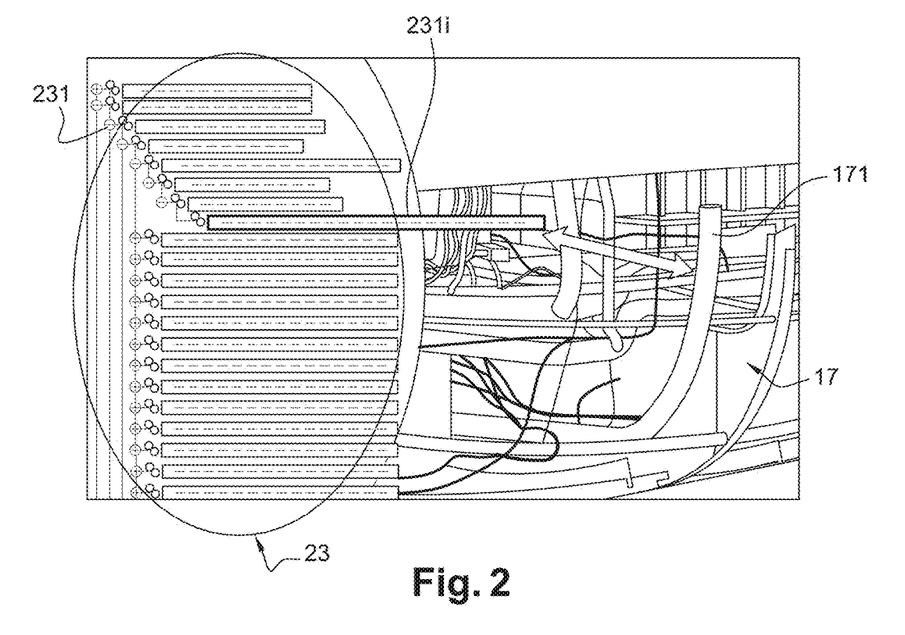
FIG. 2 diagrammatically illustrates an example of a model of a device, according to one embodiment of the disclosure herein.

FIG. 2 diagrammatically illustrates an example of a model of a device, according to one embodiment of the disclosure herein.

The device in the example in FIG. 2 corresponds to a system of pipes and cables designed to be installed on board an aircraft. During its design, this device is modelled by a three-dimensional digital mock-up 17, using a computer-aided design CAD technique. For example, the digital mock-up 17 can be created using a CATIA (Computer-Aided Three-dimensional Interactive Application) type design software. The digital mock-up 17 is a virtual and upgradable prototype that is used to study the device and to verify its integration into a dedicated environment before it physically exists.

Furthermore, the digital mock-up 17 is identified by a treelike structure 23 of nodes or logical links, also called a product structure. The nodes 231 are organized like a genealogical tree descending from a head node (or top node) representing the device as a whole as far as the last nodes (or bottom nodes) representing elementary parts making up the device. Each node 231 of the treelike structure 23 comprises references of the corresponding portion or part in the digital mock-up 17. In particular, the design software (for example CATIA) can be used to activate or to reference a given part on the digital mock-up 17 by clicking on its corresponding node in the treelike structure 23. The example in FIG. 2 shows an element 171 of the digital mock-up 17 illuminated by activation of its corresponding node 231*i*.

Figure 3:
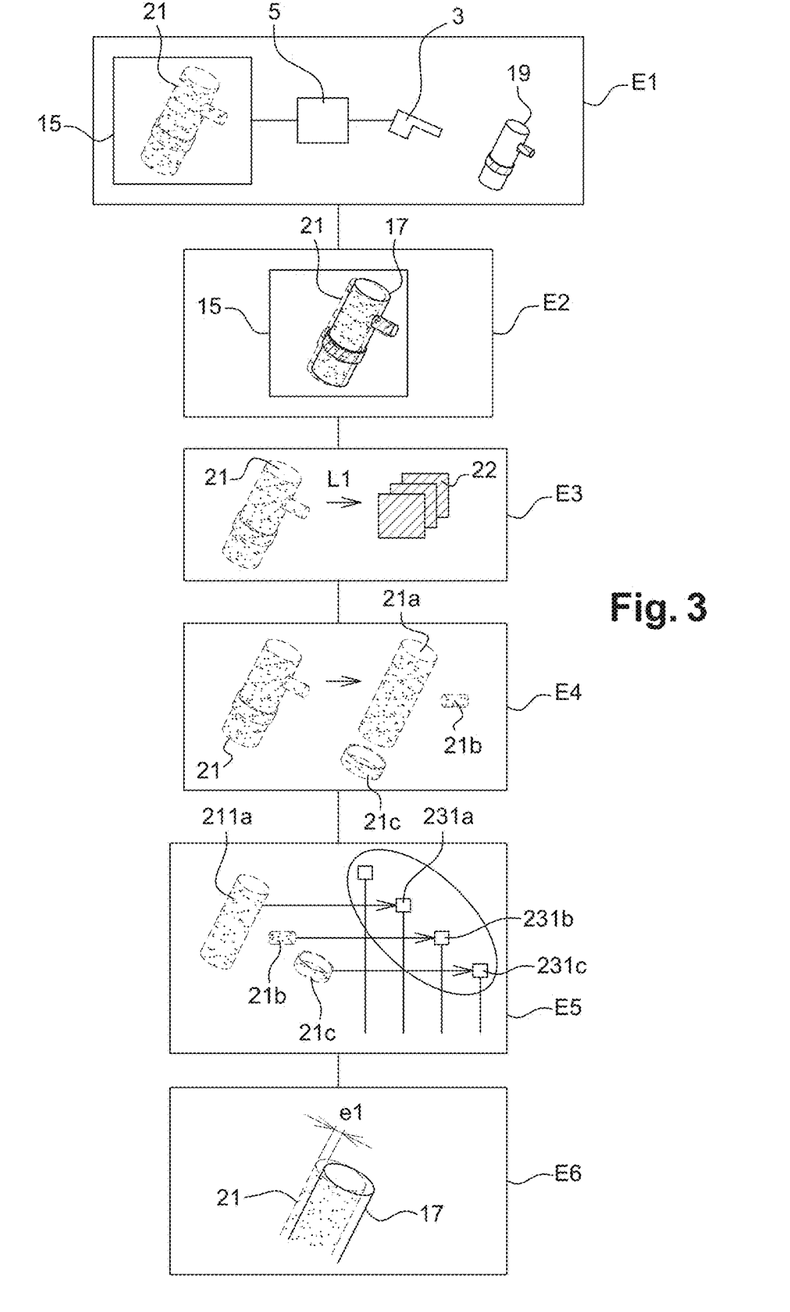
FIG. 3 diagrammatically illustrates a method of testing a device, according to one embodiment of the disclosure herein.

FIG. 3 diagrammatically illustrates a method of testing a device, according to one embodiment of the disclosure herein;

In step E1, the three-dimensional scanner 3 is adapted to scan the device 19 and to transmit scanning data to the computer 5.

It will be noted that the scanner 3 is advantageously an active contactless scanner, currently available on the business market (such as FARO, CO-Scan, SURPHASER, etc.), adapted to probe the device by emitting light radiation onto it and to detect the reflection.

More particularly, the scanner is advantageously a laser or infrared scanner that is moved around the object to be scanned. The scanner records its own displacement by measuring the shift of its own position.

As a variant, the scanner is fixed and the device is scanned by a laser beam or band and distances between the scanner and the points on the surface of the device are determined by triangulation.

Scanning then consists of or comprises collecting a sequence of measurement points representative of distances between the scanner and the scanned device. These measurement points establish precise data about the shape of the device 19 and thus produce a monochrome or polychrome point cloud 21 after processing by the software of the scanner supplier, that can be displayed on the screen 15.

More particularly, processing of the measurement points is based on a sequence of recorded polychrome images. In order to process coloring of the point cloud, the scanner and the associated software use polychrome images of the device captured and recorded by the scanner in parallel to the acquisition of measurement points.

Thus, scanning automatically generates a sequence of information grouped according to a sequence of files. These files comprise a first set including all sequences of polychrome images and a second set including the measurement points that generate the point cloud 21 representative of the device 19.

In steps E2-E5, the computer 5 is configured to process data related to the point cloud collected by the scanner 3 and to compare them with data for the digital mock-up previously stored in the memory 9.

In step E2, the processor 7 is configured to position the point cloud 21 on the digital mock-up 17 and to optimally display the resulting superposition of the geometric dimensions recorded on the device and drawn in the DMU (matching of shapes and dimensions), on the screen 15.

Advantageously, the point cloud 21 is cleaned before it is superposed on the digital mock-up 17. This cleaning consists of or comprises eliminating superfluous points and points that do not belong to the device 19 and that are not useful for the ongoing study and analysis.

In step E3, the processor 7 is configured to use the sequence of polychrome images 22 captured during the three-dimensional scan and stored in the memory 9 so as to establish a link L1 or a coordination between the point cloud 21 and these polychrome images 22. It will be noted that particular objects in the sequence of polychrome images 22 can easily by isolated using a known shape recognition software. Thus, by associating the polychrome images space 22 with the point cloud space 21, it is then easy to identify the different point sets included in the point cloud 21 that correspond to these particular objects. All that is necessary is to determine the points in the point cloud 21 that represent an image of this object (in the mathematical sense), for each isolated object in the polychrome images 22. In other words, coordination between the polychrome images space 22 and the point cloud space 21 can create a precise subdivision of the point cloud 21 into several relevant assemblies as will be described later for steps E4, E41 and E42, with a minimum cost in calculation steps.

More particularly, the processor 7 sets up this coordination by synchronizing the sequence of polychrome images 22 with the point cloud 21 according to successive capture dates of these polychrome images 22.

In step E4, the processor 7 is configured to separate the point cloud 21 into several point sets 21*a*-21*c* representing different objects of the device 19. More particularly, each point set corresponds to a particular object identified in the polychrome images.

Figure 4:
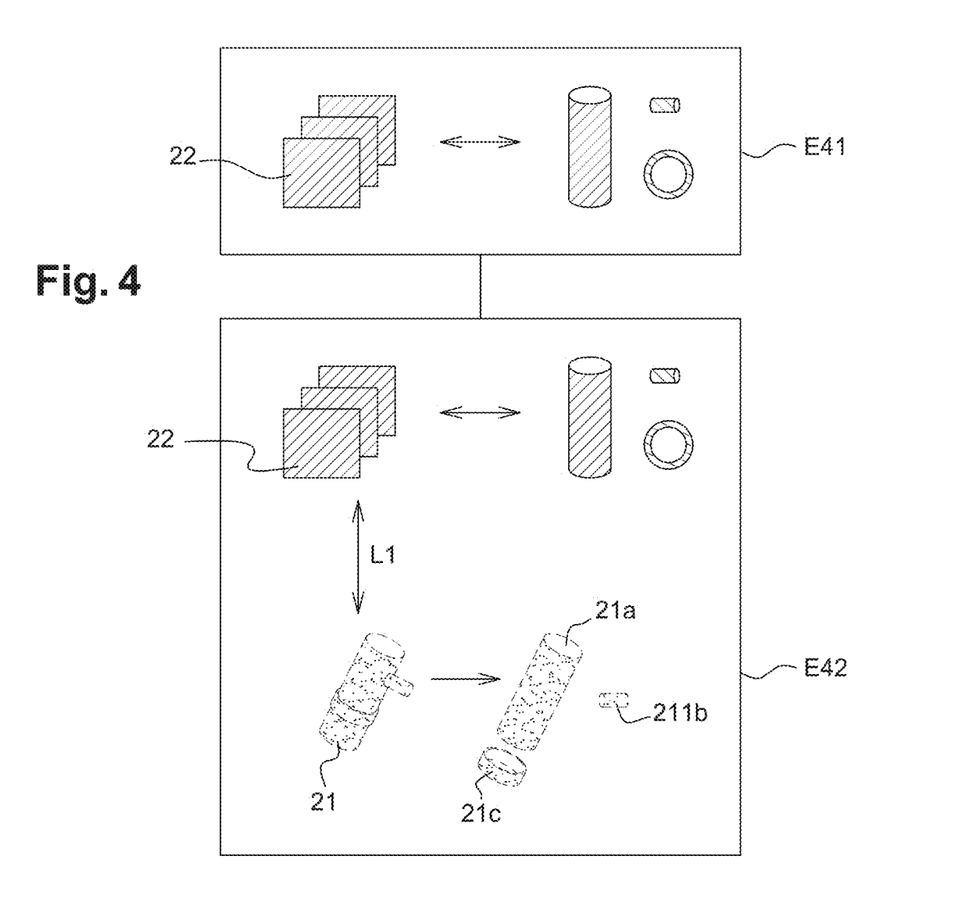
FIG. 4 diagrammatically illustrates an example of a method of separating a point cloud, according to one embodiment of the disclosure herein.

FIG. 4 diagrammatically illustrates an example of a method of separating the point cloud 21, according to one embodiment of the disclosure herein.

According to this embodiment, the processor 7 is configured to subdivide the point cloud 21 using the identification between the polychrome images space 22 and the point cloud space 21 created in step E3.

In particular, in step E41, the processor 7 is configured to identify or isolate objects with elementary or particular physical characteristics or parameters (for example specified geometric shapes, colors, positions, pixels, etc.) in the polychrome images 22. This identification can be made using a known shape and/or color recognition software. It will be noted that a recognition software is adapted to make a fast identification of the different elementary physical characteristics between two representations, by looping.

In step E42, the processor 7 is configured to subdivide the point cloud 21 into several point sets 21*a*-21*c* by associating each point set with a corresponding object identified in the polychrome images. In other words, due to the link L1 established in step E3 between the point cloud 21 and the polychrome images 22, the processor 7 can find the point packet that corresponds to each particular object identified in step E41 in the polychrome images 22. Thus, the different point sets 21*a*-21*c* can be distinctively reproduced by the processor 7 in step E4 (FIG. 3) and consequently a cloud separated into several parts 21*a*-21*c* corresponding to several objects can be displayed on the screen 15.

Then, in step E5 (FIG. 3), the processor 7 is configured to establish a correspondence between point sets 21*a*-21*c* resulting from separation of the point cloud 21 and the nodes 231*a*-231*c* of the treelike structure 23 identifying the digital mock-up 17.

The correspondence between point sets 21*a*-21*c* and the nodes of the treelike structure may for example be defined by comparative measurements between the volumes of point sets 21*a*-21*c* and previously known volumes of elementary parts represented by the nodes 231a-231c. According to the CATIA type CAD software, nodes 231a-231c of the treelike structure 23 have information about volumes and spatial coordinates of these volumes and their centres of gravity. It is also possible using a known triangulated surfaces technique to calculate an envelope volume and its coordinates in space and the coordinates of its centre of gravity, for each point set 21a-21c resulting from separation of the point cloud. Thus, a correspondence can be established between point sets 21a-21c and nodes 231a-231c of the treelike structure, using comparative measurements between firstly volumes and coordinates in space associated with point sets 21a-21c, and secondly volumes and coordinates in space associated with nodes 231a-231c.

Advantageously, point sets 21a-21c can be organized by a construction of a new treelike structure of logical nodes related to the point cloud in parallel (i.e. mirrored) to that identifying the digital mock-up. This makes it possible to improve management of the manufactured device with regard to the mock-up and the environment in which this device fits.

Furthermore, point sets 21a-21c can advantageously be saved in the first files organized using a treelike structure. Thus, links can easily be established between these first files and existing second files associated with the treelike structure of the predetermined digital mock-up.

FIGS. 5A-5D illustrate previous steps for a device installed on board an aircraft.

Figure 5A:
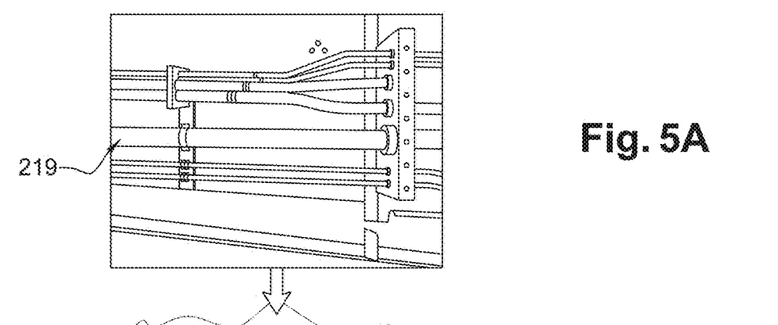
FIGS. 5A-5D illustrate the steps of the method in FIG. 4.

More particularly, FIG. 5A illustrates a physical device 219 composed of a set of pipes and cables installed on board an aircraft.

Figure 5B:
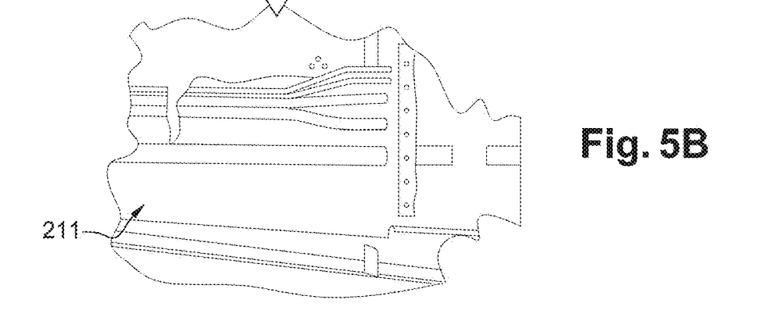

FIG. 5B illustrates a point cloud 211 resulting from scanning of the device 219 and representing the different pipes and cables of this device in monochrome.

Figure 5C:
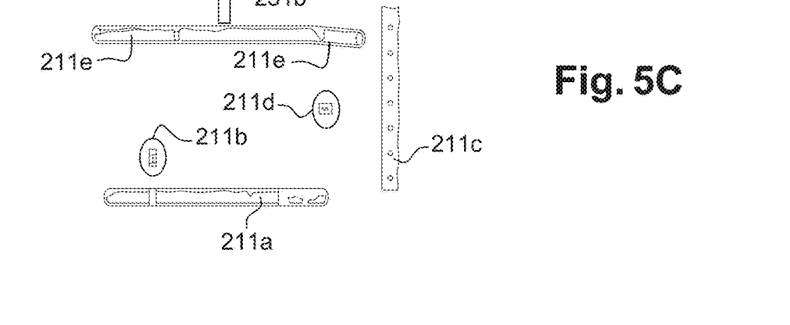

FIG. 5C illustrates separation of the point cloud 211 into several point sets 211a-211e corresponding to different elements forming the device 219. A first point set 211a corresponds to a first pipe, a second set 211b corresponds to an attachment rivet, a third set 211c corresponds to a comb or a support that retains all pipes and cables, a fourth set 211d corresponds to a nut and a fifth set 211e corresponds to a second pipe, etc.

Figure 5D:
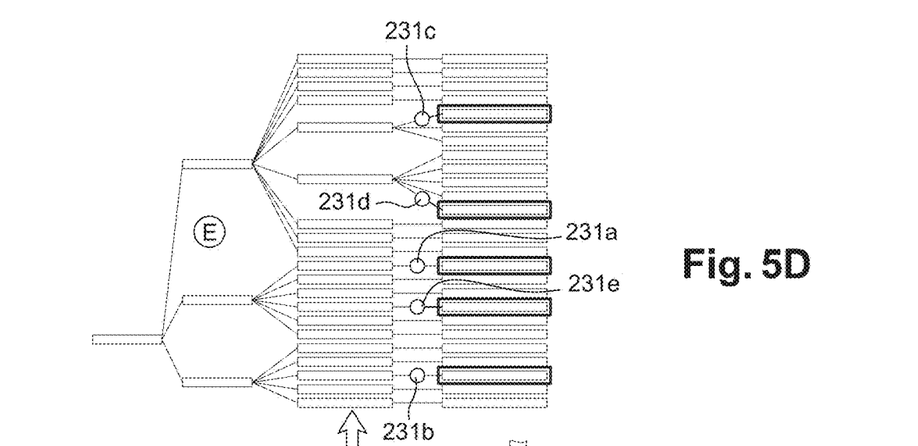

FIG. 5D illustrates the correspondence between point sets 211a-211e resulting from separation of the point cloud in FIG. 5C and nodes 231a-231e of the treelike structure 223.

In step E6 (FIG. 3), the processor 7 is configured to analyze the correspondence between point sets and the nodes of the treelike structure to evaluate the fit or the agreement between the point cloud 21 and the digital mock-up 17. This fit includes the evaluation of a difference el between each point set in the point cloud 21 and the part of the mock-up associated with the node corresponding to this point set.

Advantageously, the fit is represented by a multicolor digital montage of the point cloud 21 on the digital mock-up 17. More particularly, the digital mock-up 17 is represented in a first color (for example red), the point cloud 21 is represented in a second color (for example green) and each part of the montage in which there is a difference between the digital mock-up 17 and the point cloud 21 larger than a predetermined tolerance threshold is represented by a third color (for example yellow). Parts of the montage in which the difference is smaller than the predetermined tolerance threshold are represented in the first or the second color. For example, the value of the tolerance threshold is between about 0.5 mm and 5 mm. It will be noted that the differences between points in the three-dimensional point cloud 21 and the corresponding points in the digital mock-up can be evaluated using a known function of a CATIA type CAD software.

As a variant, the fit is represented by a multi-colored and graduated digital montage of the point cloud 21 on the digital mock-up 17. In this case, the digital mock-up 17 is represented in a first color (for example red), and the point cloud 21 in a second color (for example green). Each part of the montage with a positive difference between the digital mock-up and the point cloud is represented by a third color (for example yellow) but is graduated according to a first color scale proportional to the measured positive difference. Furthermore, each part of the montage with a negative difference between the digital mock-up and the point cloud is represented by a fourth color (for example blue) graduated according to a second color scale proportional to the absolute value of the measured negative difference.

Figures 6A, 6B, 6C:
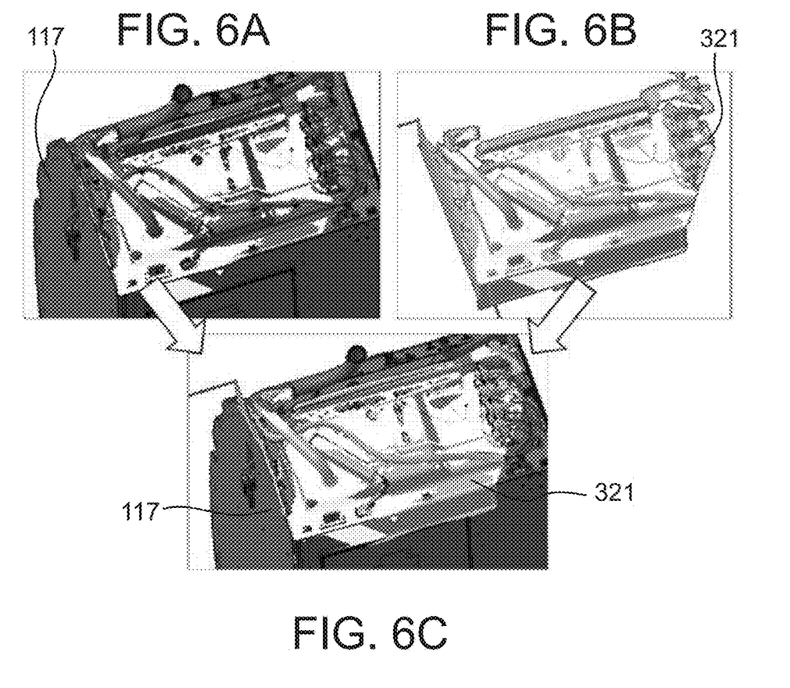
FIGS. 6A-6C diagrammatically illustrate an example of a digital montage of a three-dimensional point cloud on a corresponding digital mock-up, according to one embodiment of the disclosure herein.

FIGS. 6A-6C diagrammatically illustrate an example of a digital montage of a three-dimensional point cloud on a corresponding digital mock-up, according to one embodiment of the disclosure herein.

More particularly, FIG. 6A illustrates the digital mock-up 117 of a lavatory bowl to be installed on board an aircraft. This model is represented in monochrome using a first color (for example, red). FIG. 6B illustrates the three-dimensional point cloud 321 of the device (i.e. the bowl) after fabrication. The point cloud 321 is shown in monochrome using a second color different from the first color (for example red). Finally, FIG. 6C illustrates the superposition of the three-dimensional point cloud 321 on the digital mock-up 117 of the bowl. The montage illustrated on FIG. 6C shows that points with a difference larger than the predetermined tolerance threshold are represented by a third color (for example yellow). Furthermore, points with a difference smaller than the predetermined tolerance threshold are represented by the same color as the point cloud 321 (i.e. the second color) while points that do not belong to the point cloud 321 but do belong to the digital mock-up 171 are represented by the same color as the digital mock-up (i.e. the first color).

Figure 7:
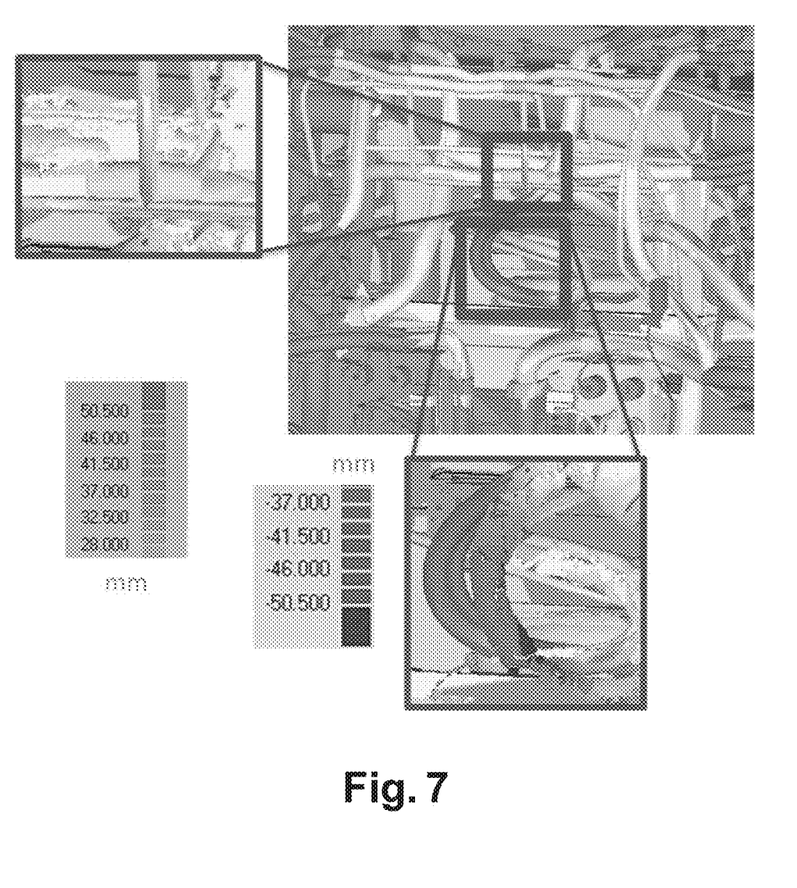
FIG. 7 diagrammatically illustrates another example of a digital montage of a three-dimensional point cloud on a corresponding digital mock-up, according to another embodiment of the disclosure herein.

FIG. 7 diagrammatically illustrates another example of a digital montage of a point cloud on a corresponding digital mock-up, according to another embodiment of the disclosure herein.

This example illustrates the superposition of a three-dimensional point cloud on the digital mock-up of a structure in an aircraft comprising pipes and cables. Each perfectly superposed part of the montage (i.e. with a difference equal to zero) is represented using a first color (for example green). Each part of the montage with a positive difference between the digital mock-up and the point cloud is represented by a second color (for example yellow) but graduated according to a first color scale (varying from 28.000 mm to 50.500 mm) proportional to the measured positive difference. For example, a very light second color denotes a very small difference, while a very dark second color denotes a large difference. Furthermore, each part of the montage with a negative difference between the digital mock-up and the point cloud is represented by a third color (for example blue) graduated according to a second color scale (in this case varying from −37.000 mm to −50.500 mm) proportional to the absolute value of the measured negative difference. Thus, a very light third color denotes a very small difference, while a very dark third color denotes a large difference.

Furthermore, the digital mock-up 17 is advantageously configured to model not only the device 19 but also its near environment (i.e. the location specifically set aside for physical installation of the device). This provides a way of verifying the real arrangement of the device 19 relative to its environment before it is physically installed. Obviously, the same steps as those in FIG. 3 are also applied on the environment because the environment forms part of the digital mock-up 17. Furthermore, the evaluation of the fit between the point cloud 21 and the digital mock-up 17 also includes a verification of the integration of the device 18 into its dedicated environment. Thus, the fit between the point cloud 21 and the digital mock-up 17 also includes an evaluation of distances (for example using the CATIA software) between the point cloud 21 and the part of the digital mock-up 17 that models the near environment of the device.

Figure 8:
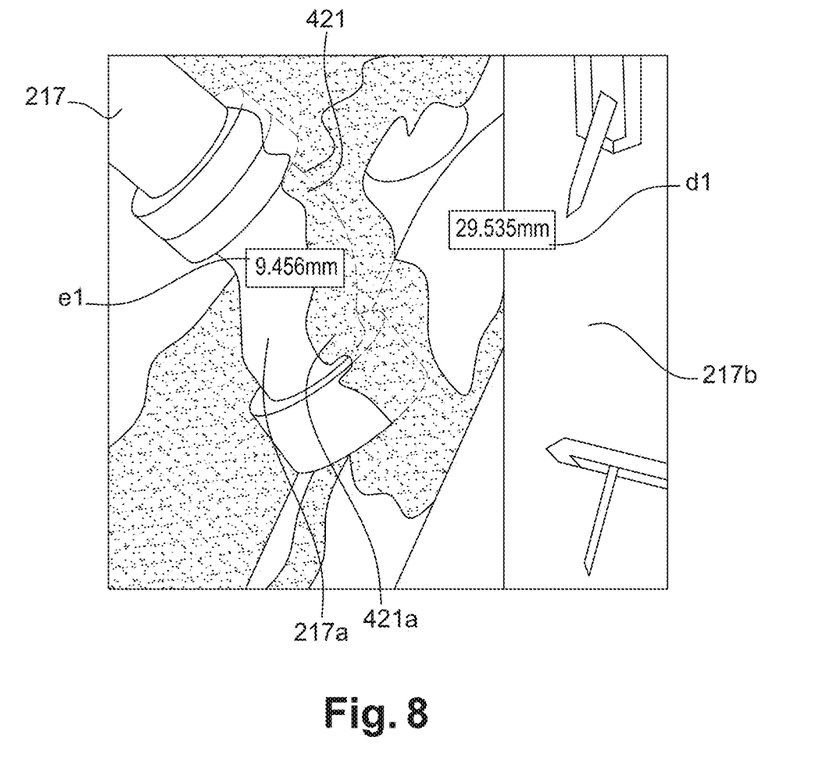
FIG. 8 illustrates an example montage of the point cloud representative of a set of pipes on a digital mock-up representative of the set of pipes in its environment on board an aircraft.

FIG. 8 illustrates an example montage of the three-dimensional point cloud 421 of a set of pipes on a digital mock-up 217 representing the set of pipes in its environment on board an aircraft. This montage illustrates a difference el equal to 9.456 mm between a pipe 421a in the point cloud 421 and the corresponding pipe 217a of the mock-up 217 and a distance d1 equal to 29.535 mm between the pipe 421a of the point cloud and the part 217b modelling a structural wall of the aircraft. This makes it possible to check if the distance is respected and to analyze the impact of a difference between theoretical model (3D mock-up) and the real device knowing that friction between the device and elements in its vicinity can cause damage to leak tightness or insulation, etc.

Furthermore, the fit between the point cloud 21 and the digital model 17 advantageously includes a check of the correspondence between point sets 21a-21c and the nodes 231a-231c of the treelike structure 23. In particular, the processor 7 is configured to verify if there is a node for each point set. This can be used to determine if each object is installed in its right position and that there are no installed objects that not included in the digital mock-up. A visual and/or sound alert is given by an output peripheral 13 in the case in which there is a point set for which there is no image of a corresponding node in the treelike structure of the digital mock-up.

Similarly, an alert will also be given in the case in which a node in the treelike structure 23 of the digital mock-up 17 has no antecedent in the point sets 21a-21c in the point cloud. This can be used to determine the case in which an element represented in the digital mock-up does not exist in the physical device.

Furthermore, the processor 7 is advantageously configured to clean the point cloud 21 by acting on the nodes of the corresponding treelike structure 23. Any part of the point cloud 21 that the operator considers is not useful can be eliminated or hidden by simply masking the node corresponding to this part.

The examples given above apply to applications related to an aircraft, but obviously any other application is possible whenever a device fabricated outside an environment has to be integrated into it.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for testing a device previously modelled by a three-dimensional digital mock-up, the digital mock-up being identified by a treelike structure of logical nodes, wherein the method comprises:
   three-dimensional scanning of the device, the scanning producing a three-dimensional point cloud representative of the device;
   superposition of the point cloud on the digital mock-up;
   coordination between the point cloud and polychrome images captured when the device is scanned;
   separation of the point cloud into several point sets using the coordination, each point set corresponding to an object identified in the polychrome images;
   establishing correspondence between the point sets and the nodes of the treelike structure; and
   evaluating a fit between the point cloud and the digital mock-up by analyzing the correspondence between the point sets and the nodes of the treelike structure.

2. The method according to claim 1, wherein the digital mock-up is adapted to model the device and its environment, where steps in the method are applied to the environment, and wherein the method comprises verifying integration of the device into its environment, as a function of the fit.

3. The method according to claim 1, wherein fit between the point cloud and the digital mock-up comprises:
   evaluating differences between each point set in the point cloud and the part of the mock-up associated with the node corresponding to the point set;
   and/or evaluating distances between the point cloud and the part of the digital mock-up modelling the environment in a vicinity of the device.

4. The method according to claim 1, wherein coordination between the point cloud and the polychrome images is made by synchronizing the polychrome images with the point cloud on successive capture dates of the polychrome images.

5. The method according to claim 1, wherein separation of the point cloud into several point sets comprises:
   Identifying objects with elementary physical characteristics in the polychrome images; and
   sub-dividing of the point cloud into the point sets, associating each point set with a corresponding object identified in the polychrome images.

6. The method according to claim 1, wherein the correspondence between the point sets and nodes in the treelike structure is defined by a construction of a new treelike structure of logical nodes related to the point cloud in parallel to that identifying the digital mock-up.

7. The method according to claim 1, comprising emitting an alert in case there is a point set for which there is no corresponding node in the treelike structure of the digital mock-up and/or in case a node in the treelike structure of the digital mock-up has no antecedent in the point sets of the point cloud.

8. The method according to claim 1, comprising:
saving point sets in first files organized according to the treelike structure; and
establishing links between the first files and second files associated with the treelike structure of the digital mock-up.

9. The method according to claim 1, wherein the fit is represented by a digital montage of the point cloud on the digital mock-up, the digital mock-up being represented by a first color, the point cloud being represented by a second color and each part of the montage with a difference between the digital mock-up and the point cloud exceeding a predetermined tolerance threshold being represented by a third color.

10. The method according to claim 1, wherein the fit is represented by a digital montage of the point cloud on the digital mock-up, the digital mock-up being represented by a first color, the point cloud being represented by a second color and each part of the montage with a positive difference between the digital mock-up and the point cloud being represented by a graduated third color according to a first color scale, and each part of the montage with a negative difference between the digital mock-up and the point cloud being represented by a graduated fourth color according to a second color scale.

11. A system for testing a device previously modelled by a three-dimensional digital mock-up, the digital mock-up being identified by a treelike structure of logical nodes, the system comprising a scanner configured to produce a three-dimensional point cloud representative of the device, and a processor and a memory configured to:
superpose the point cloud on the digital mock-up;
coordinate the point cloud with polychrome images captured during scanning of the device and stored in a memory;
disperse the point cloud into several point sets, each point set corresponding to an object identified in the polychrome images;
establish a correspondence between the point sets and the nodes of the treelike structure; and
evaluate a fit between the point cloud and the digital mock-up by analyzing the correspondence between the point sets and the nodes of the treelike structure.

12. The system for testing according to claim 11, wherein the digital mock-up is adapted to model the device and its environment, the processor also being configured to verify integration of the device into its environment by evaluating distances between the point cloud and the part of the digital mock-up modelling the environment in a vicinity of the device.

13. One or more non-transitory computer readable media storing instructions that, when executed by the one or more computers, cause the one or more computers to perform operations comprising instructions for testing a device previously modelled by a three-dimensional digital mock-up, the digital mock-up being identified by a treelike structure of logical nodes, comprising:
three-dimensional scanning of the device, the scanning producing a three-dimensional point cloud representative of the device;
superposition of the point cloud on the digital mock-up;
coordination between the point cloud and polychrome images captured when the device is scanned;
separation of the point cloud into several point sets using the coordination, each point set corresponding to an object identified in the polychrome images;
establishing correspondence between the point sets and the nodes of the treelike structure; and
evaluating a fit between the point cloud and the digital mock-up by analyzing the correspondence between the point sets and the nodes of the treelike structure.

* * * * *